(12) United States Patent
Almeida et al.

(10) Patent No.: US 10,555,031 B1
(45) Date of Patent: Feb. 4, 2020

(54) MEDIA CONTENT CONTROLLER

(71) Applicant: CSC Holdings, LLC, Bethpage, NY (US)

(72) Inventors: Heitor Almeida, Westbury, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/131,568

(22) Filed: Apr. 18, 2016

(51) Int. Cl.
*H04N 21/422* (2011.01)
*H04N 21/436* (2011.01)
*H04N 5/44* (2011.01)
*H04N 21/472* (2011.01)
*H04N 21/45* (2011.01)

(52) U.S. Cl.
CPC ..... *H04N 21/43615* (2013.01); *H04N 5/4403* (2013.01); *H04N 21/42207* (2013.01); *H04N 21/42208* (2013.01); *H04N 21/42225* (2013.01); *H04N 21/4532* (2013.01); *H04N 21/47217* (2013.01); *H04N 2005/4408* (2013.01); *H04N 2005/4444* (2013.01)

(58) Field of Classification Search
CPC ....... H04N 21/43615; H04N 21/42207; H04N 21/42208; H04N 21/42225; H04N 21/4532; H04N 21/47217; H04N 5/4403; H04N 2005/4408; H04N 2005/4444; H04N 21/422
See application file for complete search history.

(56) References Cited

U.S. PATENT DOCUMENTS

| | | | | |
|---|---|---|---|---|
| 2010/0095332 A1* | 4/2010 | Gran | .................. | H04N 21/4122 725/93 |
| 2011/0298596 A1* | 12/2011 | Warrick | ........... | H04N 21/42206 340/12.53 |
| 2011/0320963 A1* | 12/2011 | Wong | ............... | H04N 21/43615 715/755 |
| 2012/0066715 A1* | 3/2012 | Jain | .................... | H04N 21/4143 725/38 |
| 2014/0055681 A1* | 2/2014 | Murugesan | ........ | H04N 21/4227 348/734 |
| 2014/0181855 A1* | 6/2014 | Fife | ...................... | H04N 21/472 725/25 |
| 2015/0249855 A1* | 9/2015 | Dewa | ............... | H04N 21/41407 725/116 |
| 2016/0224208 A1* | 8/2016 | Bugajski | .......... | H04N 21/43615 |
| 2016/0366468 A1* | 12/2016 | Seo | .................. | H04N 21/43615 |
| 2017/0048577 A1* | 2/2017 | Chiou | ............... | H04N 21/42225 |

* cited by examiner

Primary Examiner — Pankaj Kumar
Assistant Examiner — Alexander Boyd
(74) *Attorney, Agent, or Firm* — Sterne, Kessler, Goldstein & Fox P.L.L.C.

(57) ABSTRACT

A system and method for controlling media devices are provided. A device controller includes a device control module. The device control module identifies media devices in a local network, such as a LAN. The device control module selects a media device from the identified media devices. Next the device control module selects content to be displayed on the selected media device. The device control module uses the local network to cause the selected media device to display the selected content.

28 Claims, 6 Drawing Sheets

MEDIA CONTENT CONTROLLER

BACKGROUND

Field

Embodiments are generally directed to a device controller that controls display of media content, and more specifically, to a device controller that controls selection and display of the media content on multiple media devices of different makes and models and over a local network.

Background Art

A conventional remote control is designed to control a particular make and/or model of a media device. For example, a television remote control designed to control a television of a particular make and/or model will control the television of only that make and/or model. And, to control the media device, the remote control is typically located in the visual vicinity of the media device. This poses a problem in a household, business, etc., that has multiple televisions of different models, as a viewer is required to use multiple remote controls to control the multiple televisions. Further, these multiple remote controls may be lost or misplaced and cause viewer frustration at inability to turn on the media devices on-demand and then select and view the media content.

A universal remote control partially alleviates the above problem. The universal remote control may be pre-programmed to control multiple media devices of particular makes and/or models. For instance, if the universal remote control is pre-configured with a particular make and/or model of a television, the universal remote control may be configured to control that television. But the universal remote control must be constantly updated with new makes and models of media devices (such as televisions), as more and more media devices enter the market. And, to control the media devices, the universal remote control may still need to be located within the visual vicinity of the media devices.

Also, by design, conventional remote controls and universal remote controls are designed to control media content display on the media devices. The conventional remote controls and universal remote controls cannot transfer the display of the media content from the media devices and display the content on the conventional remote controls or universal remote controls on-demand.

BRIEF SUMMARY OF EMBODIMENTS

A system and method for controlling media devices are provided. A device controller includes a device control module. The device control module identifies media devices in a local network, such as a LAN. The device control module selects a media device from the identified media devices. Next the device control module selects content to be displayed on the selected media device. The device control module uses the local network to cause the selected media device to display the selected content.

The device control module also determines a change in location of the device controller. During the change, the device control module displays the selected content on the device controller.

The device control module also selects a first media device to display content based on the proximity of the first media device to the device controller. When device controller changes location, the device control module selects a second media device to display the content based on the proximity of the device controller to the second media device.

The device control module also initiates playback of the displayed content either on the media device and/or on the device controller. The playback of the displayed content may switch between the media device and the device controller based on the location of the device controller.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Provided herein are system and method embodiments, and/or combinations and sub-combinations thereof, for a device controller configured to control multiple media devices of different makes and models. Unlike conventional remote controllers, the embodiments of the device controller described herein, do not require prior configuration or pre-configuration to control different media devices. Instead, the device controller controls different makes and/or models of media devices without prior configuration.

Additionally, the embodiments of the device controller described herein, control media devices over a wired or wireless network, such as a local area network. Control of the multiple media devices over a network allows the device controller to control media devices without being within visual proximity of the media devices, but only being in an area covered by the local network or another network connected to the local network.

Further, in addition to controlling multiple media devices of multiple makes and/or models, the embodiments of the device controller described herein, provide for content that is displayed on media devices to also be displayed on the device controller. The display of the media content on the device controller may occur simultaneously with the display on the content on the media device, or be transferred from the media device to the device controller and then back to the same or different media device.

Figure 1:
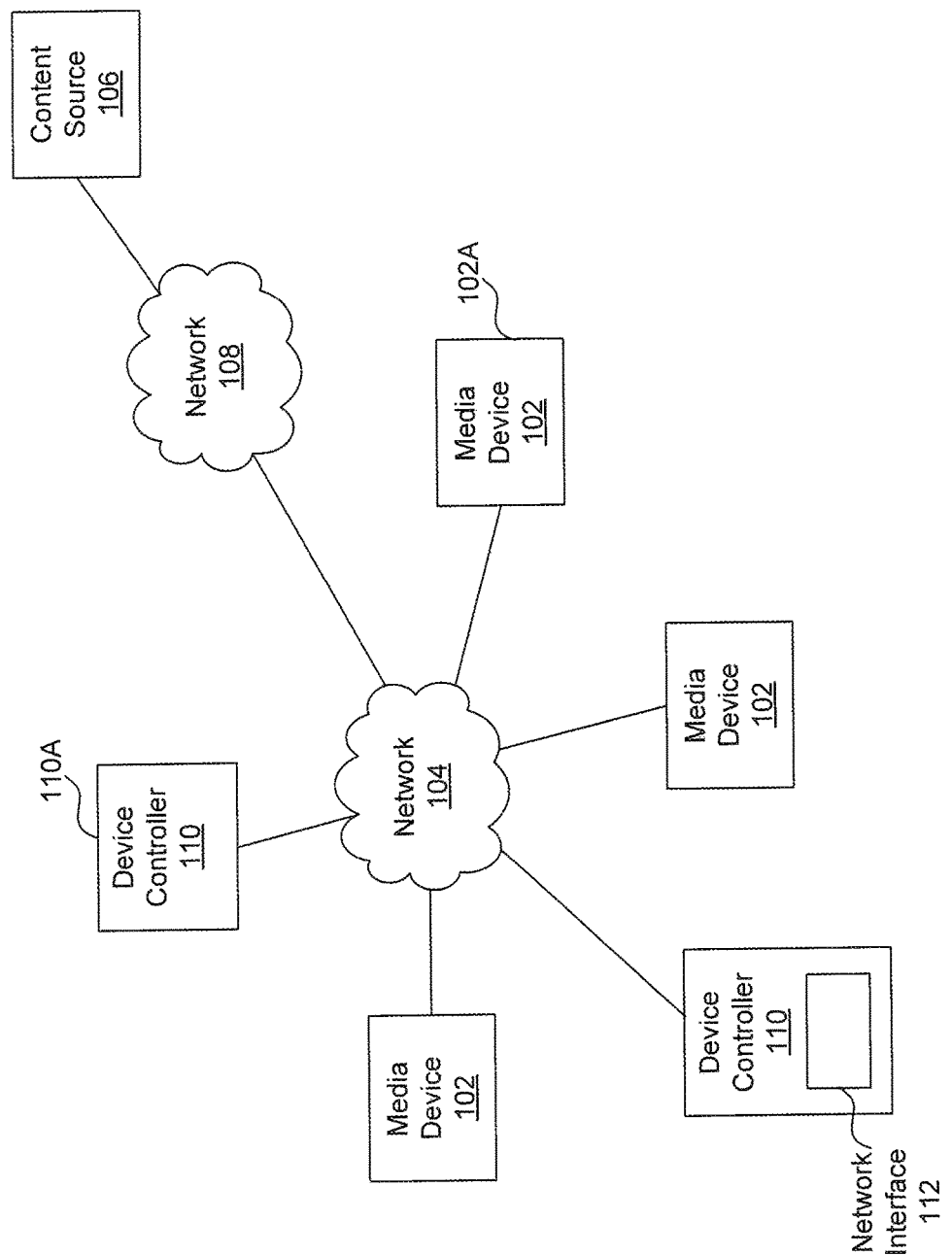
FIG. 1 is a block diagram of a system environment that displays content, according to an embodiment.

FIG. 1 is a block diagram of a system environment 100 that displays content according to an embodiment. System environment 100 or simply system 100 includes one or more media devices, such as media devices 102. Media devices 102 provide and display content, such as media content, to a viewer. Example media devices 102 may include, but are not limited to, television sets, set-top boxes, game consoles, digital media players that connect to television sets, etc. Further, media devices 102 are manufactured by different manufacturers and may be of numerous makes and models. Example media content can include live video content, recorded video content, image content, photographs, on-demand video content, digital content, analog content, audio content, etc.

Media devices 102 may receive content from an outside network, such as network 108 (described below) and display the received content. Media devices 102 may also be connected together using an internal network, such as network 104. Network 104 may be a wired network that uses Ethernet over a twisted pair cable or a wireless network that uses Wi-Fi. Network 104 may also be a local area network (LAN). When media devices 102 are connected to network 104, media devices 102 may communicate with each other and display same or different content, as will be described below.

In an embodiment, media devices 102 receive content from a content source 106. Content source 106 stores and distributes content, including media content. Additionally, content source 106 may provide content to media devices according to different methodologies. For example, content source 106 may provide on-demand content and viewer selected content to media devices 102. In another example, content source 106 may provide content to media devices 102 according to a customer subscription plan that is associated with a customer. A customer may be a viewer that views content on media devices or another user that has a relationship with a viewer. The customer subscription plan may determine a type of subscription service that the customer subscribes to, the channels associated with the subscription account that are available to the customer, the available on-demand content, etc.

In an embodiment, content source 106 provides content over network 108. Network 108 may be a wired or wireless network, and includes one or more combinations of coaxial cable, fiber optic cable, radio frequency (RF) cable, analog cable, digital cable, High-Definition Multimedia Interface (HDMI) cable, etc., that deliver analog and/or digital signals to media devices 102. Media devices 102 then translate these analog and/or digital signals into content. In a further embodiment, to connect content source 106 to media devices 102, network 108 may include intermediate servers, gateways, head-ends, set-top boxes, distribution hubs, network bridges, modems, routers, etc. In a further embodiment, network 108 is a wide area network (WAN) or a metropolitan network.

In an embodiment, network 108 may provide content directly to media devices 102 (not shown). Additionally, network 108 may also provide content to media devices 102 by connecting to network 104 by way of cable modems, routers, Ethernet cables, Wi-Fi technologies, etc. In this embodiment, content is transmitted from content source 106 over network 108 and to network 104. Network 104 then distributes content to one, some, or all media devices 102 in network 104.

In an embodiment, system 100 includes a device controller 110. Device controller 110 is a computing device that controls, manipulates, etc., content displayed on media devices 102. In one embodiment, device controller 110 may be a proprietary hardware device specifically designed to manipulate content on media devices 102. In another embodiment, device controller 110 may be a portable computing device, such as a smartphone, tablet, game console, laptop, etc. In a further embodiment, device controller 110 may be a personal computer or a desktop computer.

In yet a further embodiment, and unlike conventional remote controls that provide signals to a television, DVD, DVR, set-top-box, etc. of a particular make and/or model, device controller 110 is not associated with any particular make or model of media device 102. Instead, device controller 110 may manipulate multiple media devices 102 at the same time and regardless of the make, model, type or brand of each media device 102. Additionally, unlike conventional remote control and universal remote control devices, device controller 110 may manipulate media devices 102 without being configured or pre-configured to control media devices 102. Example configuration or pre-configuration includes providing make information, model information, manufacturer information, codes, etc., of media devices to conventional remote control devices before or after installation in order to make the remote control devices control and manipulate media devices 102 using a pre-set radio, infrared, or consumer infrared frequency. Instead, device controller 110 includes a network interface 112. Network interface 112 connects to network 104. Device controller 110 generates messages to control media devices 102 and uses network interface 112 to transmit these messages to media devices 102 over network 104.

In a further embodiment, device controller 110 may also play and display content on device controller 110 and also cause one or more media devices 102 to play the same or different content. For example, device controller 110 may issue commands to itself to play and display content or issue commands to media devices 102 that cause media devices 102 to play and display the same or different media content at the same or different times.

In an embodiment multiple device controllers 110 may connect to network 104 and control media devices 102. In one example, there may be one device controller 110 for each viewer who wants to manipulate content displayed on media devices 102. In another example, a viewer may cause device controller 110 to exclusively control a subset of media devices 102.

In a further embodiment, when multiple device controllers 110 control media content on media devices 102, each device controller 110 provides real-time data regarding which device controller 110 controls which media device 102 in network 104. The data prevents multiple device controllers 110 from controlling the same media device 102. For example, once media device 102A is being controlled by device controller 110A, media device 102A may not be controlled by other device controllers 110 until device controller 110A releases control of media device 102A. In a further embodiment, device controller 110A may also lock one of media devices 102 so that a second device controller 110 does not manipulate the locked media device 102. Locking prevents a scenario where the second device controller 110 manipulates media device 102A when media device 102A displays media content initially selected by a different device controller 110.

In a yet further embodiment, one or more of the device controllers 110 can be considered master device controllers leaving the other device controllers 110 as slave controllers. Master device controllers have the capability of issuing commands to media devices 102 that preempt or supersede commands previously issued to media devices 102 by the slave device controllers. For example, a slave device controller can issue a command to media device 102A to display a particular content. In this example, a master device controller can issue its own command to media device 102A to display different content In this example, the command issued by the master device effectively overwrites the command issued by the slave device.

In a further embodiment, a group of device controllers 110 can cooperate with each other to provide distributed command and control of media devices 102. The group of device controllers 110 can communicate amongst themselves to allocate control of media devices 102. Preferably, this communication among the group of device controllers 110 represents a direct communication without involving a server or a moderator.

Figure 2:
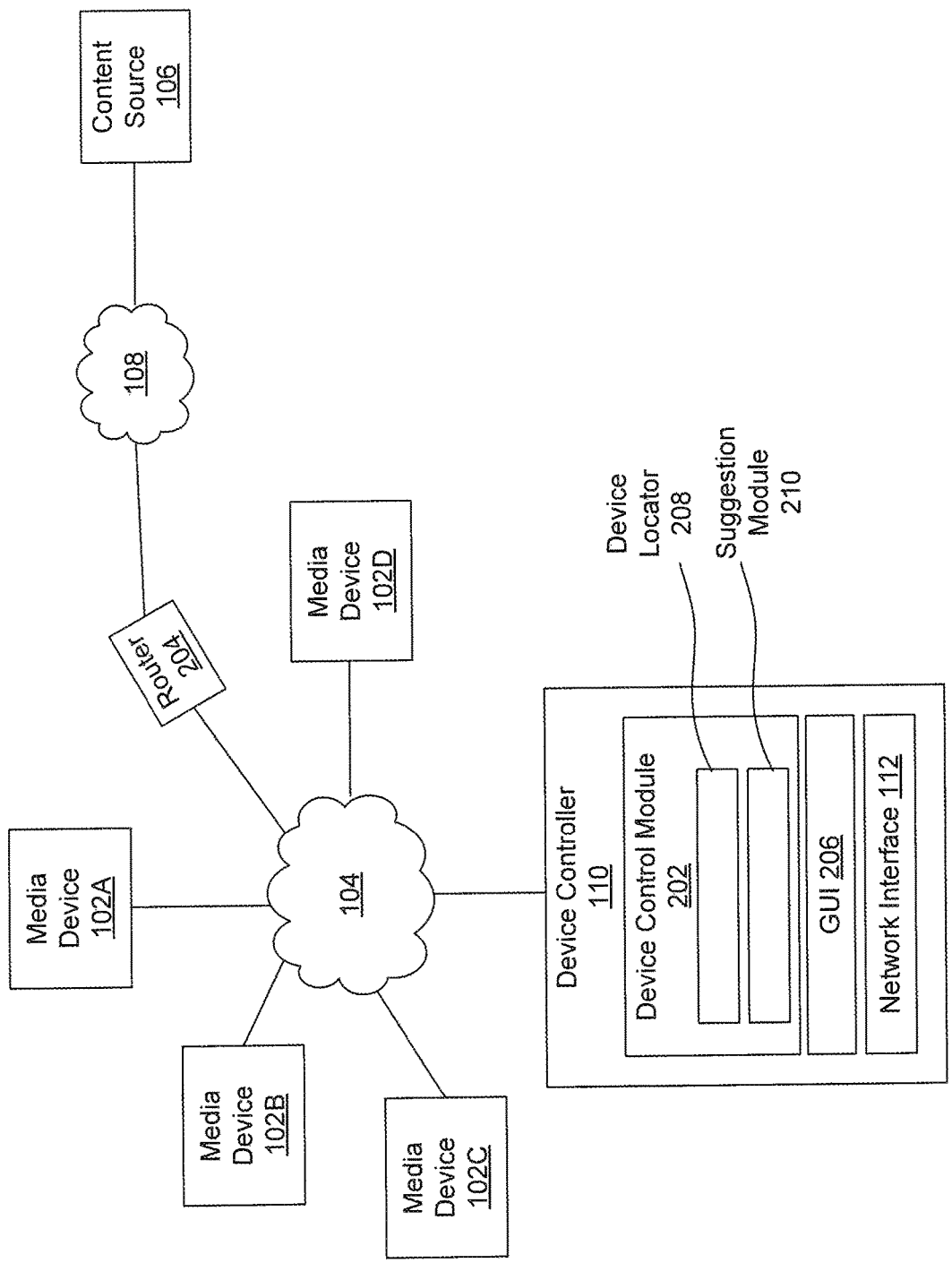
FIG. 2 is a block diagram of a system including a device controller, according to an embodiment.

FIG. 2 is a block diagram 200 of a system including a device controller, according to an embodiment. Block diagram 200 includes one or more media devices 102 (referred to as media devices 102A-D) and device controller 110 discussed in FIG. 1.

In an embodiment, device controller 110 includes a device control module 202. Device control module 202 is an application that may be installed, pre-installed, or downloaded onto device controller 110 via network 104, network 108, a USB cable connected between device controller 110 and another computing device, a thumb-drive, or a combination of any of the above, etc.

In an embodiment, device control module 202 causes device controller 110 to control one or more media devices 102, such as media devices 102A-D at the same time or on different occasions. To control media devices 102A-D, device control module 202 generates messages to media devices 102A-D and passes these messages to network interface 112 in a format compatible with network 104. Network interface 112 communicates with router 204.

In an embodiment, router 204 may be a wireless or wired router that connects and routes messages between multiple devices, such as media devices 102A-D, and device controller 110 over network 104. Router 204 also distributes content provided over network 108 to media devices 102A-D and device controller 110. In an embodiment, router 204 may include one or more network ports that connect router 204 to media devices 102A-D via an Ethernet cable, and also an internee or a WAN port that connects router 204 to network 108 via fiber-optic, coaxial, or another cable. Also, router 204 may have one or more antennas that enables router 204 to communicate wirelessly with media devices 102A-D and device controller 110.

In an embodiment, device control module 202 communicates with router 204 (via network interface 112) to determine media devices 102A-D that are connected to network 104. To identify media devices 102A-D, device control module 202 may use one or more communication protocols and/or communication technologies, including TCP/IP, infrared, radio frequency, Wi-Fi, etc. Based on the identification, device control module 202 may issue one or more commands to media devices 102A-D. These commands control the display of media content on one or more media devices 102A-D.

In an embodiment, device controller 110 includes a graphical user interface (GUI) 206 or another interface. GUI 206 is included or communicatively coupled to device control module 202.

In an embodiment, GUI 206 allows a viewer to select content and control when and where the selected content is displayed on one or more media devices 102A-D. Example content may include content associated with a customer subscription plan, content provided on one or more channels, on-demand content, DVR playback content, etc. Additionally, GUI 206 may also provide one or more services to a viewer. For example, GUI 206 may provide access to a live help desk that aids with technological issues associated with device controller 110 or media devices 102A-D. In a further embodiment, the help desk may be associated with a provider of the customer subscription plan of a viewer.

In an embodiment, GUI 206 provides a selection to a viewer that determines where the viewer wishes to display content. The selection may include one or more media devices 102A-D or device controller 110. Once GUI 206 receives a selection of one or more media devices 102A-D (such as media device 102A) on which to display content, GUI 206 communicates with device control module 202. Device control module 202 then generates a message to the selected media device 102A and transmits the message using network interface 112 over network 104. The message includes the selection of the content to be displayed on media device 102A. In another embodiment, if the selection is device controller 110 itself, device controller 110 may display media content on the display screen of device controller 110. In this case, device control module 202 causes device controller 110 to display the selected content. In a further embodiment, device controller 110 may also display content simultaneously on selected media device 102A and device controller 110, or switch the display of content from media device 102A to device controller 110 or vice versa.

In a further embodiment, device controller 110 also includes playback functionality. Playback functionality allows a viewer to replay, pause, playback, fast forward or rewind content, including streaming or live media content (a viewer may only rewind live media content). The playback functionality may occur on device controller 110 or media devices 102A-D. Additionally, playback functionality may also be available when device controller 110 switches display of content between media devices 102A-D or between device controller 110 and media devices 102A-D.

In an embodiment, to activate playback functionality, device controller 110 may use device control module 202 and/or GU 206 which includes the playback interface, such as rewind and fast-forward selections. In addition, GUI 206 may also receive a selection of one or more media devices 102A-D on which to display the played back content, such as media device 102A. Alternatively, GUI 206 may receive a selection of whether to play back content on device controller 110. Once playback of content and the playback device is selected, device control module 202 generates a message that causes the playback of the selected media content on the selected device, such as media device 102A or device controller 110.

In a further embodiment, GUI 206 and device control module 202 may provide for displaying the playback of content on the media device which originally displayed the content, such as media device 102A, by default.

In yet a further embodiment, GUI 206 and device control module 202 may provide for switching the display of played back content between multiple media devices 102A-D and device controller 110. Further, the playback may occur without losing the frame or position of the played back content, when the played back content is being switched between multiple media devices 102A-D and/or device controller 110. In this case, the position of played back content is maintained before and after the switch. For example, if the switch of played back content occurs from media device 102A to media device 102B at frame 123, media device 102B will begin the playback at frame 123. In yet another embodiment, device control module 202 may play back content or switch the playback of content to one of media devices 102A-D that is proximate or most proximate to device controller 110. Further, the switch can occur as device controller 110 changes location within network 104 to be more proximate to one of media devices 102A-D.

In an embodiment, device controller 110 may use telemetry to determine proximity of device controller 110 to each of media devices 102A-D. For example, router 204 may track location of media devices 102A-D and device controller 110 using a telemetry tag. A telemetry tag may be included in messages that are transmitted from device control module 202 or media devices 102A-D to router 204. The telemetry tag stores location of one of media devices 102A-D or device controller 110. Router 204 may then use the telemetry tags provided by device control module 202 and/or media devices 102A-D to determine the location of media devices 102A-D compared to device controller 110 in network 104, and identify one of media devices 102A-D that is most proximate to device controller 110.

In another embodiment, device control module 202 may include a device locator 208. Device locator 208 determines location of device controller 110 and also media devices 102A-D in network 104. In an embodiment, router 204 may transmit locations of media devices 102A-D stored in telemetry tag (or otherwise obtained) to device locator 208. Device locator 208 then uses the transmitted locations of media devices 102A-D and the location of device controller 110 to determine proximity of media devices 102A-D to device controller 110, as well as the location of the most proximate media device 102A, 102B, 102C, or 102D. A person skilled in the art will appreciate that there may be other ways, such as global positioning systems (GPS) that device locator 208 may use to determine proximity of media devices 102A-D to device controller 110. For example, device locator 208 may receive GPS data from media devices 102 using network 104 or from router 204. Additionally, device locator 208 may retrieve the GPS data for device controller 110. Based on the GPS data, device locator 208 then identifies the proximity of media devices 102A-D to device controller 110, and also the most proximate media device 102A, 102B, 102C, or 102D to device controller 110.

In an embodiment, device locator 208 may also determine when device controller 110 changes locations. For example, a viewer may pick up device controller 110 and relocate to another area in network 104. When device locator 208 identifies that device controller 110 is changing locations, device control module 202 may switch content to be displayed on media device 102A, 102B, 102C, or 102D that is most proximate to device controller 110. In another embodiment, when device locator 208 identifies that device controller 110 is changing locations, device control module 202 may display content on device controller 110. In this embodiment, device control module 202 may continue to display content on device controller 110 until device controller 110 completes changing locations and then switch the display of content to one of media device 102A, 102B, 102C, or 102D that are proximate to device controller 110.

In a further embodiment, device control module 202 includes a suggestion module 210. Suggestion module 210 tracks media devices 102A-D that device controller 110 caused to display content. Based on the tracking, suggestion module 210 suggests one or more of media devices 102A, 102B, 102C or 102D to a viewer on which to display content. Suggestion module 210 may suggest one or more of media device 102A-D based on the time of day, previously selected content that has been viewed on one or more of media devices 102A-D, the most often used media device 102A, 102B, 102C or 102D, etc. Suggestion module 210 may also suggest media devices 102A-D based on a location of device controller 110 as determined by using device locator 208. Additionally, suggestion module 210 may suggest media device 102A-D based on one of media devices 102A-D that has most frequently been selected from a particular location of device controller 110.

In an embodiment, GUI 206 may display the suggested media device to a viewer.

In an embodiment, device controller 110 may also identify a viewer and target content to the identified viewer. For example, device control module 202 may be associated with a subscription account that includes a customer subscription plan. To activate device control module 202, the viewer may provide viewer credentials that are associated with the subscription account. The subscription account may store content that has previously been viewed by the viewer and provide the same or similar content for selection to the viewer.

In another embodiment, device control module 202 may store multiple viewer profiles. The viewer using device control module 202 may then use an existing viewer profile and obtain or select content associated with the viewer profile. In another embodiment, a viewer may cause device control module 202 to generate a new viewer profile. Device control module 202 may then recommend content for the new viewer profile. The recommendation may be based on a questionnaire that device control module 202 provides on GUI 206 to the viewer. Additionally the recommendation may also be supplemented using the previously viewed content as the viewer begins and continues to use the new viewer profile.

Figure 3:
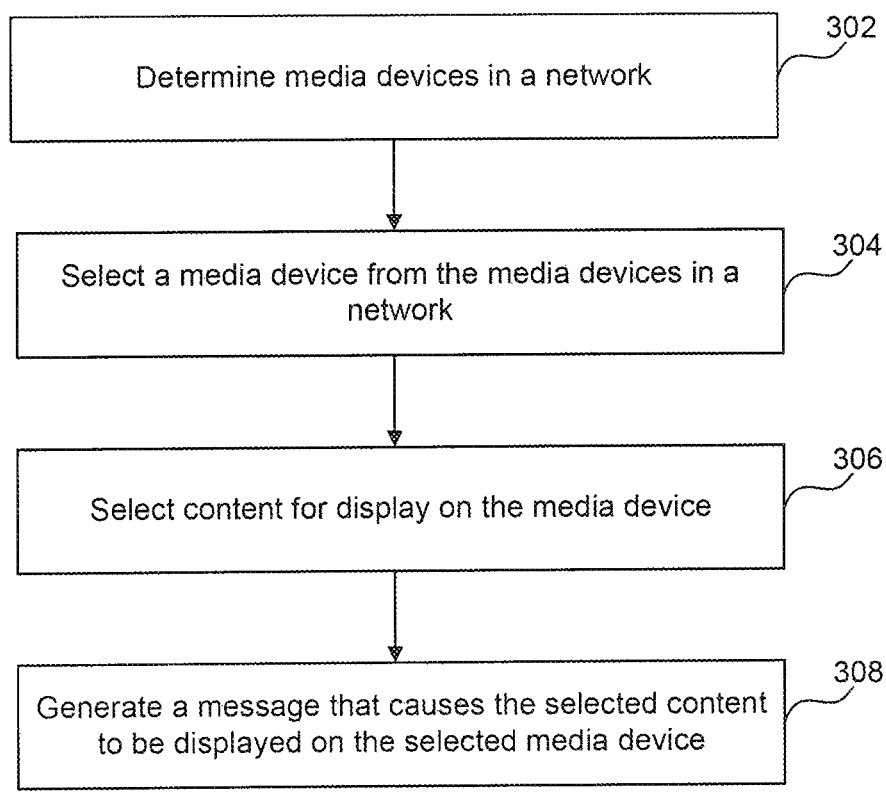
FIG. 3 is a flowchart of a method for using a device controller to select content for display on a media device, according to an embodiment.

FIG. 3 is a flowchart of a method 300 for using a device controller to select content for display on a media device, according to an embodiment.

At stage 302, media devices in a network are determined. For example, device controller 110 determines media devices 102 that are connected to a local network, such as network 104.

At stage 304, a media device is selected. For example, media device 102A may be selected based on proximity of media devices 102A-D to device controller 110. For example, device locator 208 alone or in combination with router 204 determines proximity of device controller 110 to media devices 102A-D. In a further example, device locator 208 determines the most proximate media device 102A, 102B, 102C or 102D and selects the most proximate media device to display content. In another example, media device 102A may be selected based on previous choices of a viewer operating device controller 110.

At stage 306, content is selected. For example, device controller 110 receives a selection of content, such as media content, from a viewer via device control module 202 and/or GUI 206.

At stage 308, a message that causes the selected content to be displayed on the selected media device is generated. For example, content selected in stage 306 is displayed on media device 102A selected in stage 304. To display the selected content. device controller 110 generates a message that indicates a selection of content, and transmits the message to media device 102A via network 104. The transmission may be in a network compliant communication protocols, such as TCP/IP, radio frequency protocols, Wi-Fi, etc. As discussed above, the selected content may be displayed on media device 102A without direct communication between media device 102A and device controller 110. Instead, device controller 110 uses network 104 to communicate with media device 102A.

Figure 4:
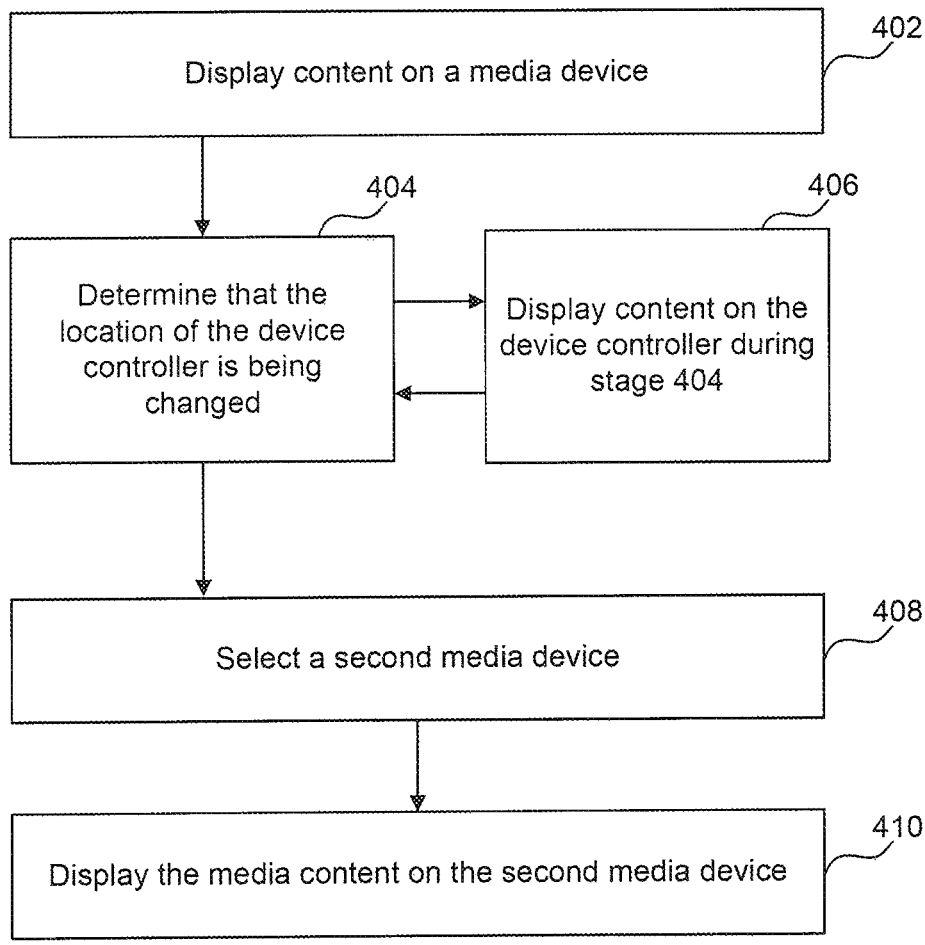
FIG. 4 is a flowchart of a method for using a device controller to display content on multiple media devices, according to an embodiment.

FIG. 4 is a flowchart of a method 400 for using a device controller to display content on multiple media devices, according to an embodiment.

At stage 402, content is displayed on a media device. For example, content is displayed on media device 102A from media devices 102A-D connected to network 104.

At stage 404, location of a device controller is being changed. For example, the viewer using device controller 110 relocates to a different location in a house or another environment that hosts network 104. In an embodiment, the viewer holding device controller 110 may relocate to be near media device 102B.

At stage 406, content is displayed on the device controller. For example, as the viewer changes location together with device controller 110 in stage 404, device controller 110 switches the display of content that is being displayed on media device 102A to device controller 110. The display of content on device controller 110 may continue during the duration of stage 404. Further, the display of content on device controller 110 may occur automatically when the location of device controller 110 is being changed or a viewer may use GUI 206 to select the display of content on device controller 110.

At stage 408, a second media device is selected. For example, device controller 110 selects media device 102B that is proximate or most proximate to the new location of device controller 110. In yet a further embodiment, media device 102A may also be selected if media device 102A is most proximate to the new location of device controller 110.

At stage 410, content is displayed on the media device selected in stage 408. For example, device controller 110 causes content displayed on device controller 110 during stage 404 to be displayed on the media device 102A or 102B (whichever is selected in stage 408). To cause the content to be displayed, device control module 202 causes device controller 110 to issue a message over network 104 to a media device selected in stage 408 to display content.

Figure 5:
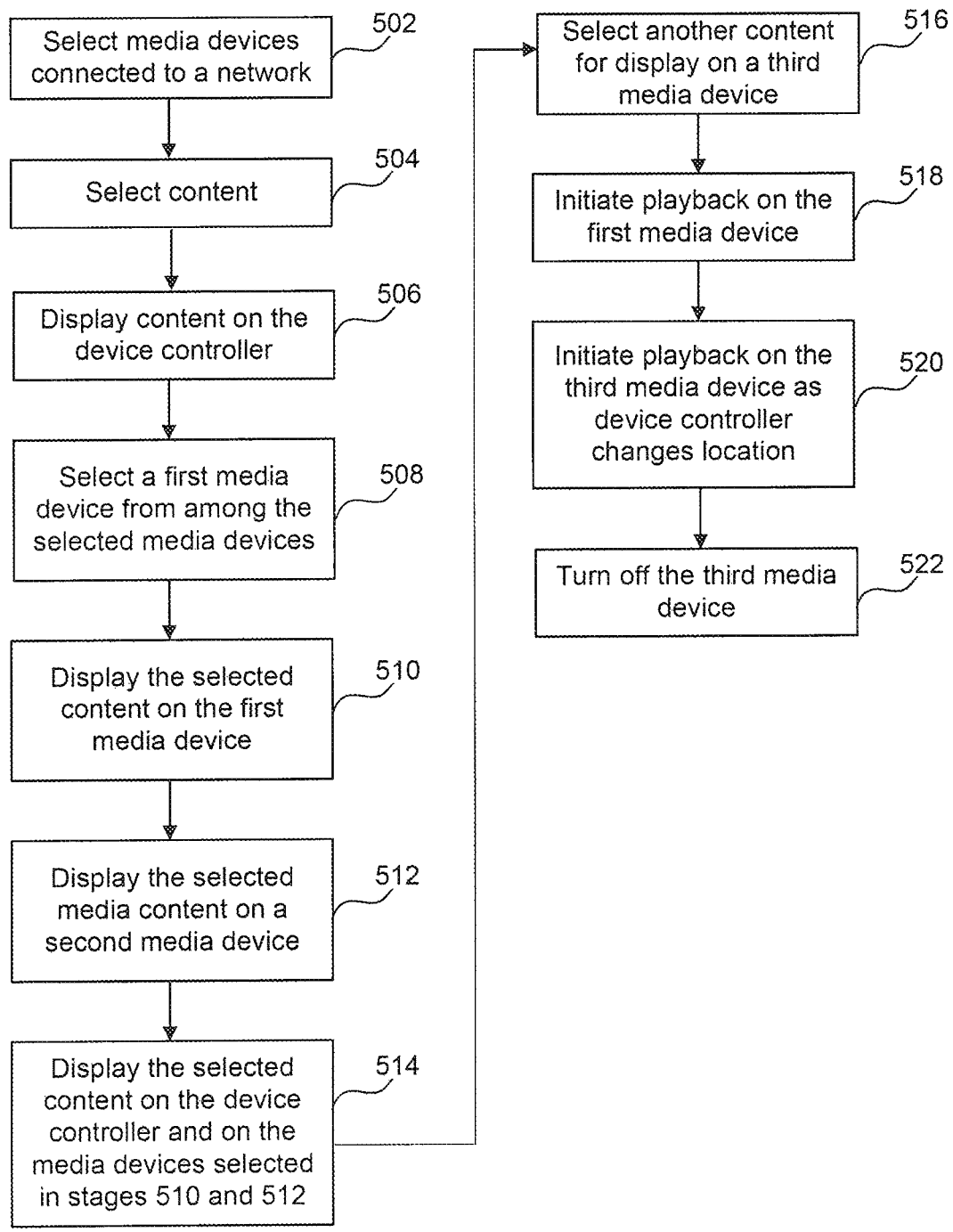
FIG. 5 is a flowchart of a method for selecting content for display on media devices in a real-world environment, according to an embodiment.

FIG. 5 is a flowchart of a method 500 for selecting content for display on media devices in a real-world environment, according to an embodiment. In method 500, four media devices 102A-D are connected to network 104 located in a home. Further, device controller 110 is associated with a subscription account that controls content displayed on media devices 102A-D. In a further embodiment, device controller 110 may be a smartphone and is controlled by a subscriber associated with the subscription account.

At stage 502, media devices are selected. For example, a subscriber uses device controller 110 to select media devices 102A-D that are connected to network 104.

At stage 504, content is selected. For example, subscriber uses device controller 110 to select content. Example content may be a live football game.

At stage 506, the content is displayed on a device controller. For example, the device controller 110 receives instructions from the subscriber to display the football game on device controller 110. Once received, device controller 110 displays the football game on device controller 110.

At stage 508, a first media device 102A from media devices 102A-D is selected. For example, the first media device 102A corresponds to one of the media devices 102A-D that is more proximate to the device controller 110.

At stage 510, the first media device 102A displays the content. For example, if device locator 208 determines that device controller 110 is more proximate to first media device 102A, then the football game is displayed on media device 102A.

At stage 512, second media device 102B from media devices displays content. For example, device controller 110 receives instructions from the subscriber via GUI 206 to display the football game on second media device 102B. Here, device control module 202 issues a message over network 104 to media device 102B to display the football game. After stage 512 both media devices 102A and 102B display the same content—the football game.

At stage 514, content is displayed on the device controller and on the media devices selected in stages 510 and 512. For example, device controller 110 receives instructions from the subscriber via GUI 206 to display the football game on device controller 110 and on media devices 102A and 102B. Such a scenario may occur when guests arrive at the subscriber's house and a subscriber wishes to continue to display content on media devices 102A and 102B, and also on device controller 110 as the subscriber goes to open the door.

At stage 516, different content is selected for display on a third media device 102C from media devices 102A-D. For example, device controller 110 receives instructions from GUI 206 to display cartoons on media device 102C. Once received, device controller 110 issues messages to third media device 102C to display cartoons. As discussed above, device controller 110 issues a message over network 104 to media device 102C to display the cartoon content.

At stage 518, playback is initiated on a media device selected in stage 510. For example, device controller 110 receives instructions from the subscriber to play back a portion of the football game that the subscriber wanted to re-play. As playback is initiated, device locator 208 initiates a playback command to media device 102A over network 104 by default. Alternatively, the subscriber may also select media device 102A or 102B to display playback of the portion of the football game.

At stage 520, playback is initiated on a media device selected in stage 512. For example, the subscriber, along with device controller 110, has moved to a location in the house. Device locator 208 detects the movement of device controller 110 and initiates a playback command to media device 102B. For example, device locator 208 detects that device controller 110 is now more proximate to media device 102B and initiates a playback command to media device 102B.

At stage 522, a third media device is turned off. For example, device controller 110 receives instructions to turn off media device 102C. Once received, device controller 110 generates a message to turn off media device 102C, and transmits the message to media device 102C over network 104. As media device 102C is turned off, media devices 102A and 102B continue to display the football game.

Figure 6:
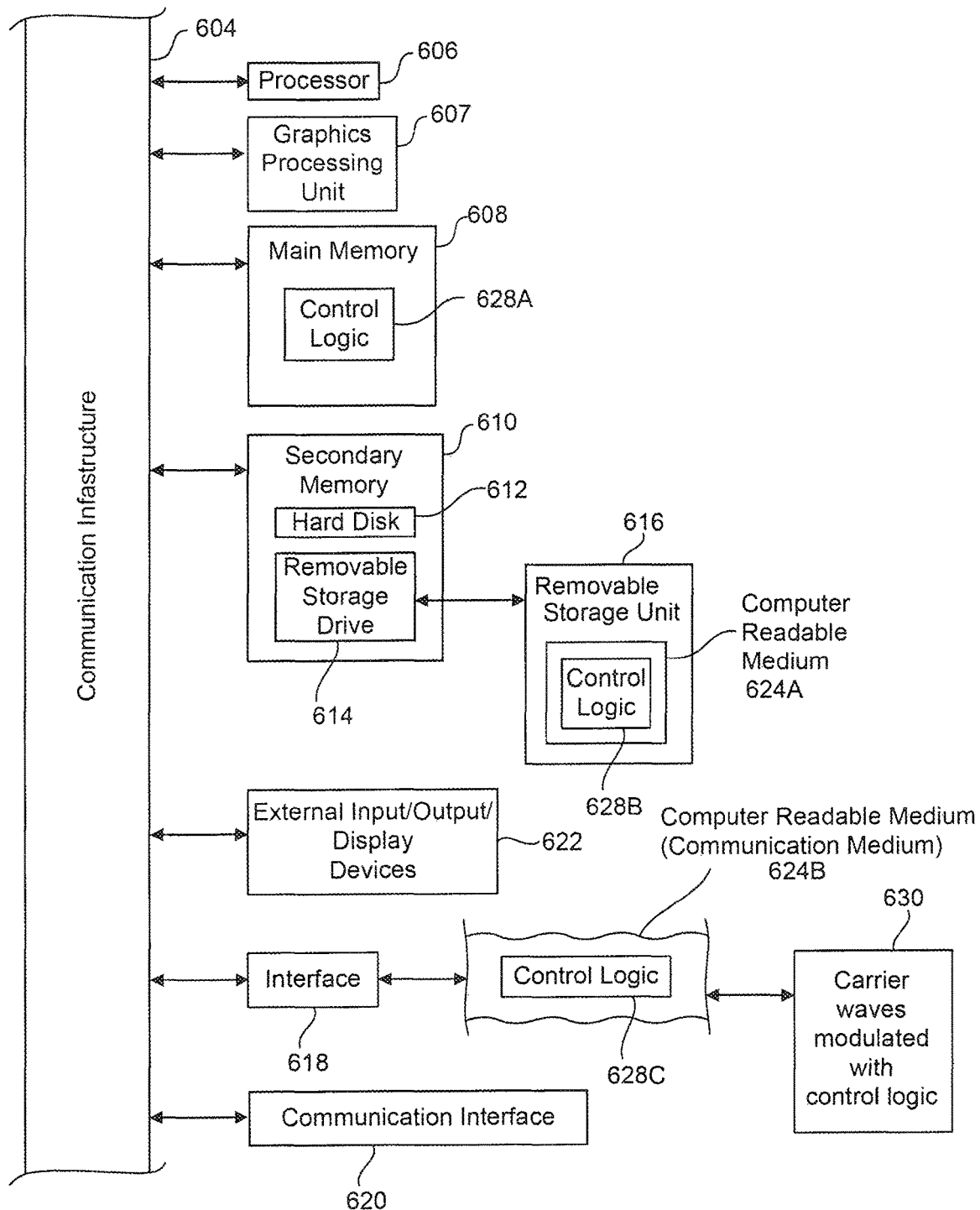
FIG. 6 is a block diagram of a computer system, where the embodiments may be implemented.

Various embodiments of device controller 110 and other devices described in FIGS. 1-5 may be implemented by software, firmware, hardware, or a combination thereof. FIG. 6 illustrates an example computer system 600 in which the embodiments, or portions thereof, can be implemented as computer-readable code. For example, the methods illustrated by event diagrams described herein can be implemented in system 600. Various embodiments are described in terms of this example computer system 600. After reading this description, it will become apparent to a person skilled in the relevant art how to implement the embodiments using other computer systems and/or computer architectures.

Computer system 600 includes one or more processors, such as processor 606. Processor 606 can be a special purpose or a general purpose processor. Processor 606 is connected to a communication infrastructure 606 604 (for example, a bus or network).

Computer system 600 also includes one or more graphics processing units, such as graphics processing unit ("GPU") 607. GPU 607 is also connected to a communication infrastructure 604. GPU 607 is a specialized processor that executes instructions and programs, selected for complex graphics and mathematical operations, in parallel. For example, GPU 607 may be adept at displaying and processing streaming media content.

Computer system 600 also includes a main memory 608, such as random access memory (RAM) or another volatile memory that stores data while the computer system is turned on, and may also include a secondary memory 610. Secondary memory 610 may include, for example, a hard disk drive 612 and/or a removable storage drive 614 or another non-volatile storage that maintains data regardless whether computer system 600 is turned on or off. Removable storage drive 614 may comprise a floppy disk drive, a magnetic tape drive, an optical disk drive, a flash memory, or the like. The removable storage drive 614 reads from and/or writes to a removable storage unit 616 in a well-known manner. Removable storage unit 616 may comprise a floppy disk, magnetic tape, optical disk, etc. which is read by and written to by removable storage drive 614. As will be appreciated by persons skilled in the relevant art(s), removable storage unit 616 includes a tangible computer readable storage medium 624A having stored therein control logic 628B such as computer software and/or data.

In alternative implementations, secondary memory 610 may include other similar means for allowing computer programs or other instructions to be loaded into computer system 600. Such means may include, for example, a removable storage unit 616 and an interface 618. Examples of such means may include a program cartridge and cartridge interface (such as that found in video game devices), a removable memory chip (such as an EPROM, or PROM) and associated socket, and other removable storage units 616 and interfaces 618 which allow software and data to be transferred from the removable storage unit 616 to computer system 600. As will be appreciated by persons skilled in the relevant art(s), interface 618 also includes a tangible computer readable storage medium 624B having stored therein control logic 628C such as computer software and/or data.

Computer system 600 may also include a communications interface 620. Communications interface 620 allows software and data to be transferred between computer system 600 and external devices 622. Communications interface 620 may include a modem, a network interface (e.g., an Ethernet card), a communications port, a PCMCIA slot and card, or the like. Software and data transferred via communications interface 620 are in the form of signals which may be electronic, electromagnetic, optical, or other signals capable of being received by communication interface 620. Software and data transferred via communications interface 620 are provided to communications interface 620 via a communications path. Communications path may be implemented using wire or cable, fiber optics, a phone line, a cellular phone link, a radio frequency (RF) link or other communications channels.

The communication and network interface 620 allows the computer system 600 to communicate over communication networks or mediums such as LANs, WANs the Internet, etc. The communication and network interface 620 may interface with remote sites or networks via wired or wireless connections.

In this document, the terms "computer program medium" and "computer usable medium" and "computer readable medium" are used to generally refer to media such as removable storage unit 616 and a hard disk 612 installed in hard disk drive 612. Computer program medium, computer usable medium, or computer readable medium can also refer to memories, such as main memory 608 and secondary memory 610, which can be memory semiconductors (e.g. DRAMs, etc.). These computer program products are means for providing software to computer system 600.

Computer programs (also called computer control logic 628) are stored in main memory 608, such as control logic 628A and/or secondary memory 610, such as control logic 628B. Computer programs may also be received via interface 618, such as control logic 628C. Such computer programs, when executed, enable computer system 600 to implement embodiments as discussed herein, such as the system described above. In particular, the computer programs, when executed, enable processor 606 to implement the processes of embodiments. Accordingly, such computer programs represent controllers of the computer system 600. Where embodiments are implemented using software, the software may be stored in a computer program product and loaded into computer system 600 using removable storage drive 614, interface 618, hard drive 612 or communications interface 620.

Embodiments can be accomplished, for example, through the use of general-programming languages (such as C or C++), hardware description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied fin program code and may be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

In the detailed description above, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as, not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A device controller for controlling operation of a plurality of media devices, comprising:
a memory that stores a device control module;
a processor, coupled to the memory, configured to execute the device control module, the device control module, when executed by the processor, configuring the processor to:
track one or more first media devices that the device controller previously caused to display first content from among the plurality of media devices within a local network;
suggest one or more second media devices from among the one or more first media devices to display second content when a location of the device controller has changed;
receive a selection of a first media device from among the one or more second media devices to display the second content; and
cause, using the local network, display of the second content on the first media device without prior configuration of the device controller to control the first media device.

2. The device controller of claim 1, further comprising a display, and
wherein the device control module, when executed by the processor, further configures the processor to:
determine a change in location of the device controller; and
display the second content on the display during the change in the location.

3. The device controller of claim 1, wherein the device control module, when executed by the processor, further configures the processor to select the first media device from the one or more second media devices that is most proximate to the device controller in response to the selection.

4. The device controller of claim 3, wherein the device control module, when executed by the processor, further configures the processor to:
determine a change in location of the device controller;
determine that the device controller is more proximate to a second media device from the one or more second media devices; and
select the second media device to display the second content.

5. The device controller of claim 4, wherein the device control module, when executed by the processor, further configures the processor to cause, using the local network, display of the second content on the second media device together with the display of the second content on the first media device.

6. The device controller of claim 1, wherein the device control module, when executed by the processor, configures the processor to:
generate a message that causes the first media device to display the second content; and
transmit the message to the first media device over the local network to cause the first media device to display the second content.

7. The device controller of claim 1, wherein the second content comprises:
media content.

8. The device controller of claim 1, wherein the device control module, when executed by the processor, further configures the processor to:
initiate playback of the second content on the first media device;
determine a change in location of the device controller; and
initiate playback of the second content on the device controller when the device controller changes location.

9. The device controller of claim 1, wherein the device control module, when executed by the processor, further configures the processor to:
initiate playback of the second content on the first media device;
determine a change in location of the device controller; and
initiate playback of the second content on a second media device from the one or more second media devices when the device controller changes location and is more proximate to the second media device than the first media device.

10. The device controller of claim 1, wherein the device control module, when executed by the processor, further configures the processor to:
   select a second media device from the one or more second media devices, the second media device being a similar device as the first media device and a different make, model, type, or brand of the similar device, and
   cause, using the local network, display of the second content on the second media device without prior configuration of the device controller to control the second media device.

11. The device controller of claim 1, wherein the device control module, when executed by the processor, configures the processor to suggest the one or more second media devices based upon a time of day or frequencies of selection of the plurality of media devices.

12. The device controller of claim 1, wherein the device control module, when executed by the processor, further configures the processor to:
   identify a viewer of the first media device, and
   select the second content from among a plurality of content that is targeted to the viewer.

13. A method for controlling operation of a plurality of media devices, comprising:
   tracking, by a device controller, one or more first media devices that the device controller previously caused to display first content from among the plurality of media devices within a local network;
   suggesting, by the device controller, one or more second media devices from among the one or more first media devices to display second content when a location of the device controller has changed;
   receiving, by the device controller, a selection of a first media device from among the one or more second media devices to display the second content; and
   causing, by the device controller using the local network, display of the second content on the first media device without prior configuration of the device controller to control the first media device.

14. The method of claim 13, further comprising:
   determining, by the device controller, a change in location of the device controller; and
   displaying the second content on the device controller during the change in the location.

15. The method of claim 13, wherein selecting the first media device comprises:
   selecting the first media device from the one or more second media devices that is most proximate to the device controller in response to the selection.

16. The method of claim 15, further comprising:
   determining, by the device controller, a change in location of the device controller;
   determining that the device controller is proximate to a second media device from the one or more second media devices; and
   selecting, by the device controller, the second media device to display the second content.

17. The method of claim 16, further comprising:
   causing, by the device controller using the local network, the second media device to display the second content displayed on the first media device.

18. The method of claim 13, wherein the causing further comprises:
   generating a message that causes the first media device to display the second content; and
   transmitting the message to the first media device over the local network.

19. The method of claim 13, wherein the second content comprises:
   media content.

20. The method of claim 13, further comprising:
   initiating, by the device controller, playback of the second content on the first media device;
   determining, by the device controller, a change in location of the device controller; and
   initiating, by the device controller, playback of the second content on the device controller when the device controller changes location.

21. The method of claim 13, further comprising:
   initiating, by the device controller, playback of the second content on the first media device;
   determining, by the device controller, a change in location of the device controller; and
   initiating, by the device controller, playback of the second content on a second media device from the one or more second media devices when the device controller changes location and is more proximate to the second media device than the first media device.

22. The method of claim 13, further comprising:
   selecting, by the device controller, a second media device from the one or more second media devices, the second media device being a similar device as the first media device and a different make, model, type, or brand of the similar device, and
   cause, by the device controller using the local network, display of the second content on the second media device without prior configuration of the device controller to control the second media device.

23. The method of claim 13, wherein the suggesting comprises:
   suggesting the one or more second media devices based upon a time of day or frequencies of selection of the plurality of media devices.

24. The method of claim 13, further comprising:
   identifying, by the device controller, a viewer of the first media device, and
   selecting, by the device controller, the second content from among a plurality of content that is targeted to the viewer.

25. A system for controlling operation of a plurality of media devices coupled to a local network, comprising:
   a plurality of device controllers coupled to the local network,
   wherein a device controller from the plurality of device controllers is configured to:
      track one or more first media devices that the device controller previously caused to display first content from among the plurality of media devices within the local network;
      suggest one or more second media devices from among the one or more first media devices to display second content when a location of the device controller has changed; and
      cause, in response to receiving a selection of a first media device from among the one or more second media devices using the local network, the first media device to display the second content without prior configuration of the device controller to control the first media device and while locking out one or more remaining device controllers from the plurality of device controllers from manipulating the first media device.

26. The system of claim 25, wherein the device controller is further configured to:

select a second media device from the one or more second media devices;
select third content for display on the second media device, wherein the third content is different from the second content; and
cause, using the local network, the second media device to display the third content while the first media device displays the second content.

27. The system of claim 25, wherein the device controller is further configured to select the first media device from the one or more second media devices that is most proximate to the device controller in response to the selection.

28. The system of claim 25, wherein the device controller is further configured to:
select a second media device from the one or more second media devices, the second media device being a similar device as the first media device and a different make, model, type, or brand of the similar device, and
cause, using the local network, display of the second content on the second media device without prior configuration of the device controller to control the second media device.

* * * * *